United States Patent
Aburada et al.

(10) Patent No.: US 11,261,118 B2
(45) Date of Patent: Mar. 1, 2022

(54) APPARATUS AND METHOD FOR RAPID COOLING OF A GLASS RIBBON IN A GLASS MAKING PROCESS

(71) Applicant: CORNING INCORPORATED, Corning, NY (US)

(72) Inventors: Tomohiro Aburada, Painted Post, NY (US); Anmol Agrawal, Horseheads, NY (US); Shawn Rachelle Markham, Harrodsburg, KY (US); Alper Ozturk, Elmira, NY (US); Vinay A Patel, Lexington, KY (US); Jae Hyun Yu, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 293 days.

(21) Appl. No.: 16/500,580

(22) PCT Filed: Apr. 3, 2018

(86) PCT No.: PCT/US2018/025822
§ 371 (c)(1),
(2) Date: Oct. 3, 2019

(87) PCT Pub. No.: WO2018/187283
PCT Pub. Date: Oct. 11, 2018

(65) Prior Publication Data
US 2021/0114915 A1    Apr. 22, 2021

Related U.S. Application Data

(60) Provisional application No. 62/481,221, filed on Apr. 4, 2017.

(51) Int. Cl.
*C03B 17/06*    (2006.01)

(52) U.S. Cl.
CPC .......... *C03B 17/067* (2013.01); *C03B 17/068* (2013.01)

(58) Field of Classification Search
CPC ........................... C03B 17/064; C03B 17/067
See application file for complete search history.

(56) References Cited

U.S. PATENT DOCUMENTS

| | | | | |
|---|---|---|---|---|
| 2,261,022 A | * | 10/1941 | Fox | C03B 3/00 65/22 |
| 2,313,495 A | * | 3/1943 | Tanberg | C03B 15/06 65/204 |

(Continued)

FOREIGN PATENT DOCUMENTS

| CN | 102725238 A | 10/2012 |
|---|---|---|
| CN | 202543033 U | 11/2012 |

(Continued)

OTHER PUBLICATIONS

Taiwanese Patent Application No. 107111100, Office Action dated May 18, 2021, 6 pages (English Translation Only); Taiwanese Patent Office.

(Continued)

*Primary Examiner* — Jodi C Franklin
(74) *Attorney, Agent, or Firm* — Ryan T. Hardee

(57) ABSTRACT

An apparatus for making a glass sheet including a forming apparatus, a transition member, and a heat transfer device. The forming apparatus forms a glass ribbon from a supply of molten glass. The transition member encloses the glass ribbon adjacent the forming apparatus, and defines an interior space through which the glass ribbon passes. The heat transfer device is disposed within the interior space, and comprises a tube and a fin. The tube defines an exterior surface and an interior passage. The fin projects from the exterior surface. With this construction, the heat transfer (Continued)

device functions to extract heat radiated by the glass ribbon while minimizing the formation of flow vortices.

27 Claims, 12 Drawing Sheets

(56) References Cited

U.S. PATENT DOCUMENTS

| | | | |
|---|---|---|---|
| 3,223,510 A | 12/1965 | Ward | |
| 3,533,250 A | 10/1970 | Malicheff | |
| 3,672,861 A * | 6/1972 | Ritter, Jr. et al. | ... C03B 27/0404 65/350 |
| 3,682,609 A * | 8/1972 | Dockerty | C03B 17/064 65/83 |
| 3,794,477 A * | 2/1974 | Farabaugh et al. | G05D 5/06 65/158 |
| 4,339,262 A | 7/1982 | Liepelt | |
| 5,244,483 A * | 9/1993 | Brosch | C03B 37/083 420/463 |
| 6,997,017 B2 * | 2/2006 | Pitbladdo | C03B 17/064 65/195 |
| 7,984,625 B2 * | 7/2011 | Markham | C03B 17/067 65/29.12 |
| 8,210,001 B2 * | 7/2012 | Allan | C03B 17/064 65/53 |
| 8,393,178 B2 | 3/2013 | Aniolek et al. | |
| 8,397,536 B2 * | 3/2013 | Delia | C03B 17/064 65/84 |
| 8,429,936 B2 | 4/2013 | Allan et al. | |
| 8,459,062 B2 * | 6/2013 | Ahrens | C03B 17/064 65/195 |
| 8,528,365 B2 * | 9/2013 | Delia | C03B 17/067 65/157 |
| 8,689,585 B2 | 4/2014 | Delia et al. | |
| 8,899,078 B2 * | 12/2014 | Zhou | C03B 17/068 65/195 |
| 9,108,873 B2 * | 8/2015 | Maeda | C03B 17/064 |
| 9,429,936 B2 | 8/2016 | Iijima et al. | |
| 2006/0081009 A1 * | 4/2006 | Maldonado | C03B 17/067 65/195 |
| 2008/0006059 A1 * | 1/2008 | Hanna | C03B 37/0209 65/481 |
| 2008/0184743 A1 * | 8/2008 | Hanna | C03B 37/0213 65/481 |
| 2009/0100873 A1 | 4/2009 | Allan et al. | |
| 2009/0217705 A1 * | 9/2009 | Filippov | C03B 18/02 65/99.1 |
| 2011/0126591 A1 * | 6/2011 | Chalk | C03B 17/064 65/84 |
| 2011/0209502 A1 * | 9/2011 | El Kahlout | C03B 17/067 65/90 |
| 2011/0289969 A1 * | 12/2011 | Delia | C03B 17/064 65/84 |
| 2012/0216575 A1 * | 8/2012 | Delia | C03B 17/064 65/134.6 |
| 2012/0318020 A1 * | 12/2012 | Delia | C03B 17/067 65/29.19 |
| 2013/0125594 A1 * | 5/2013 | Singer | C03B 37/08 65/469 |
| 2014/0123710 A1 * | 5/2014 | Lineman | C03B 5/42 65/135.1 |
| 2014/0238077 A1 * | 8/2014 | Anderson | C03B 17/067 65/29.11 |
| 2016/0107916 A1 * | 4/2016 | Welles | C03B 17/064 65/53 |
| 2016/0297703 A1 * | 10/2016 | Aniolek | C03B 17/064 |
| 2017/0305777 A1 * | 10/2017 | Black | F23J 15/06 |
| 2018/0297882 A1 * | 10/2018 | De Angelis | C03B 5/44 |
| 2018/0319694 A1 * | 11/2018 | Aniolek | C03B 17/064 |
| 2018/0334405 A1 * | 11/2018 | Buellesfeld | C03B 17/067 |
| 2018/0370836 A1 * | 12/2018 | Aniolek | C03B 17/064 |
| 2019/0010074 A1 * | 1/2019 | Chen | C03B 35/167 |
| 2019/0010075 A1 * | 1/2019 | Nakamura | C03B 35/167 |
| 2019/0202729 A1 * | 7/2019 | Champion | A61K 39/385 |
| 2019/0375668 A1 * | 12/2019 | Bookbinder | C03C 3/087 |
| 2019/0375669 A1 * | 12/2019 | Delia | C03B 25/12 |
| 2021/0032149 A1 * | 2/2021 | Franzen | C03B 17/064 |

FOREIGN PATENT DOCUMENTS

| | | | |
|---|---|---|---|
| EP | 1746076 A1 | 1/2007 | |
| FR | 1109813 A | 2/1956 | |
| GB | 1054322 A | 1/1967 | |
| GB | 1138756 A | 1/1969 | |
| JP | 55-014064 B1 | 4/1980 | |
| JP | 03-001096 A | 1/1991 | |
| JP | 05-124833 A | 5/1993 | |
| JP | 08-245235 A | 9/1996 | |
| JP | 2012-176885 A | 9/2012 | |
| JP | 2013-071888 A | 4/2013 | |
| JP | 2014-070000 A | 4/2014 | |
| JP | 2014-518190 A | 7/2014 | |
| JP | 2014-529570 A | 11/2014 | |
| TW | 201302634 A | 1/2013 | |
| WO | 2009/108338 A1 | 9/2009 | |
| WO | WO-2016200788 A2 * | 12/2016 | ............ C03B 5/44 |
| WO | WO-2017034978 A1 * | 3/2017 | ......... C03B 33/033 |
| WO | WO-2017087738 A1 * | 5/2017 | ......... C03B 17/067 |

OTHER PUBLICATIONS

International Search Report and Written Opinion of the International Searching Authority; PCT/US2018/025822; dated Jun. 25, 2018; 12 Pages; European Patent Office.

Chinese Patent Application No. 201880023790.1, Office Action dated Aug. 3, 2021, 5 pages (English Translation Only, Chinese Patent Office.

Japanese Patent Application No. 2019-554620, Office Action dated Dec. 1, 2021, 10 pages (5 pages of English Translation and 5 pages of Original Copy); Japanese Patent Office.

* cited by examiner

APPARATUS AND METHOD FOR RAPID COOLING OF A GLASS RIBBON IN A GLASS MAKING PROCESS

CROSS-REFERENCE TO RELATED APPLICATIONS

This application is a national stage entry of International Patent Application Serial No. PCT/US2018/025822 filed on Apr. 3, 2018, which in turn, claims the benefit of priority under 35 U.S.C. § 119 of U.S. Provisional Application Ser. No. 62/481,221 filed on Apr. 4, 2017, the contents of each of which are relied upon and incorporated herein by reference in their entireties.

BACKGROUND

Field

The present disclosure generally relates to apparatuses and methods for making glass. More particularly, it relates to cooling of a glass ribbon generated as part of a glass making process or system, such as with a glass drawing apparatus.

Technical Background

In a typical glass manufacturing system, various raw constituents or batch materials are introduced or "charged" into a melting furnace. The batch materials are melted to form a viscous molten material that can be flowed to a fabrication portion of the system. The viscous molten material, when cooled, forms a glass.

The manufacture of glass sheets or other glass articles by melting raw materials is known. In one such process, known as a fusion process, molten glass overflows the sides of a trough in a forming body. The separate flows then re-unite, or fuse, at the bottom of the forming body to form a continuous ribbon of glass. Separate sheets of glass are then cut from the glass ribbon. Fusion processes are used in glass manufacturing operations to produce thin glass sheets that are used in a variety of products including flat panel displays.

With conventional fusion processes, the forming body is maintained within an enclosure (sometimes referred to as a "muffle"), and the glass ribbon as it exits the forming body (e.g., is pulled or drawn by a series of rollers) is surrounded by a transition member(s) or shroud. Among other things, the shroud can serve to maintain a desired thermal environment in the region defined by the shroud and surrounding the glass ribbon. One or more heat transfer elements or devices are oftentimes located at or adjacent regions of the transition member at various locations along the path of travel of the glass ribbon, for example between the forming body and the first (or upstream-most) set of rollers, operating to provide a desired thermal effect. In some instances, it can be desirable to extract heat from the thermal environment of the glass ribbon. For example, a cylindrical cooling tube (or "bayonet") may be located within the transition member in close proximity to the forming body, serving to cool (i.e., extract heat via radiation) the thermal environment, and thus the glass ribbon immediately as it exits the forming body. While this technique can be viable, instabilities in the thermal environment may develop due to the cold bayonet and the hot glass ribbon. These instabilities, in turn, may cause undesired variations (wavy patterns) in the resultant glass.

The convectional cell concerns described above can also occur with other glass manufacturing techniques in which a formed glass ribbon is subjected to radiative cooling conditions in an enclosed spaced. For example, the slot forming process, the float process, and Fourcault's process of glass manufacturing all can incorporate a radiative cooling device.

Accordingly, alternative apparatuses and methods for cooling a glass ribbon in a glass manufacturing process are disclosed herein.

SUMMARY

Some embodiments of the present disclosure relate to an apparatus for making a glass sheet including a forming apparatus, a transition member, and a heat transfer device. The forming apparatus forms a glass ribbon from a supply of molten glass. The transition member encloses the glass ribbon adjacent the forming apparatus, and defines an interior space through which the glass ribbon passes. The heat transfer device is disposed within the interior space, and comprises a tube and a fin. The tube defines an exterior surface and an interior passage. The fin projects from the exterior surface. With this construction, the heat transfer device functions to extract heat radiated by the glass ribbon while minimizing the formation of flow vortices. In some embodiments, the fin is, or is akin to, an elongated plate. In other embodiments, the fin can have an airfoil shape.

Yet other embodiments of the present disclosure relate to a draw apparatus for drawing a glass ribbon from a forming apparatus. The draw apparatus comprises a transition member and a heat transfer device. The transition member encloses the glass ribbon adjacent the forming apparatus. The transition member defines an interior space through which the glass ribbon travels. The heat transfer device is disposed within the interior space, and comprises a tube and a fin. The tube defines an exterior surface and an interior passage. The fin projects from the exterior surface.

Yet other embodiments of the present disclosure relate to a method for making a glass sheet. The method comprises directing a glass ribbon through a transition member. The transition member encloses the glass ribbon and defines an interior space through which the glass ribbon travels. Heat is extracted from the interior space with a heat transfer device during the step of directing the glass ribbon. The heat transfer device is located within the interior space. The heat transfer device is disposed within the interior space, and comprises a tube and a fin. The tube defines an exterior surface and an interior passage. The fin projects from the exterior surface. In some embodiments, the step of extracting heat includes directing airflow within the interior space along the fin to provide substantially laminar airflow within the interior space at a region of the heat transfer device.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate various embodiments described herein, and together with the description serve to explain the principles and operations of the claimed subject matter.

DETAILED DESCRIPTION

Figure 1:
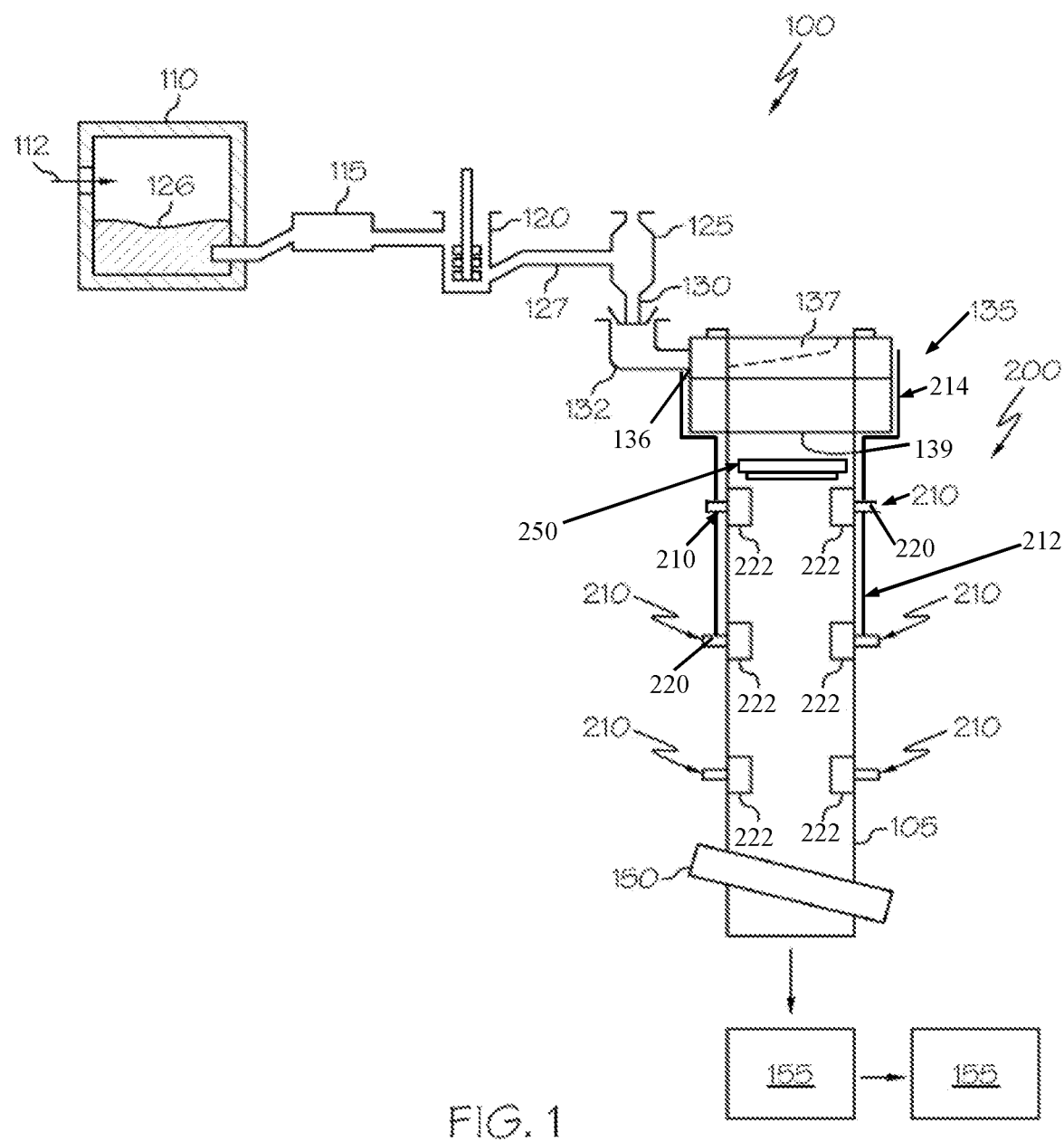
FIG. 1 schematically depicts a glass manufacturing apparatus in accordance with principles of the present disclosure, with portions shown in block form.

Reference will now be made in detail to various embodiments of apparatuses and methods for cooling a glass ribbon and glass manufacturing operations. Whenever possible, the same reference numerals will be used throughout the drawings to refer to the same or like parts. FIG. 1 generally depicts a glass manufacturing apparatus used in the production of glass in a draw operation. The glass manufacturing apparatus processes batch materials into molten glass, which is then introduced to a forming apparatus from which the molten glass flows to form a glass ribbon. While the following description is presented in the context of forming a sheet of glass in a fusion glass making process, the principles described herein are applicable to a broad range of activities where molten glass is contained within a closed or partially closed spaced and cooling of a glass ribbon generated from the molten glass is desired. The principles disclosed herein are therefore not limited by the following specific embodiments, and may be used, for example, in other glass making processes, such as float, up-draw, slot-style and Fourcault's-style processes.

Referring now to FIG. 1, a glass manufacturing apparatus 100 that incorporates a fusion process to produce a glass ribbon is depicted. The glass manufacturing apparatus 100 includes a melting vessel 110, a fining vessel 115, a mixing vessel 120, a delivery vessel 125, a forming apparatus 135, a draw apparatus 200, and a cutting apparatus 150. The glass manufacturing apparatus 100 produces a continuous glass ribbon 105 from batch materials, by melting and combining the batch materials into molten glass, distributing the molten glass into a preliminary shape, applying tension to the glass ribbon 105 to control dimensions of the glass ribbon 105 as the glass cools and viscosity increases, and cutting discrete glass sheets 155 from the glass ribbon 105 after the glass has gone through a visco-elastic transition and has mechanical properties that give the glass sheets 155 stable dimensional characteristics. The visco-elastic region of the glass ribbon 105 extends from approximately the softening point of the glass to the strain point of the glass. Below the strain point, the glass is considered to behave elastically.

In operation, batch materials for forming glass are introduced into the melting vessel 110 as indicated by arrow 112 and are melted to form molten glass 126. The molten glass 126 flows into the fining vessel 115, which is maintained at a temperature above that of the melting vessel 110. From the fining vessel 115, the molten glass 126 flows into a mixing vessel 120, where the molten glass 126 undergoes a mixing process to homogenize the molten glass 126. The molten glass 126 flows from the mixing vessel 120 to the delivery vessel 125, which delivers the molten glass 126 through a downcomer 130 to an inlet 132 and into the forming apparatus 135.

The forming apparatus 135 depicted in FIG. 1 is used in a fusion draw process to produce glass ribbon 105 that has high surface quality and low variation in thickness. The forming apparatus 135 includes an opening 136 that receives the molten glass 126. The molten glass 126 flows into a trough 137 and then overflows and runs down the sides of the trough 137 in two partial ribbon portions before fusing together below a bottom edge (root) 139 of the forming apparatus 135. The two partial ribbon portions of the still-molten glass 126 rejoin with one another (e.g., fuse) at locations below the root 139 of the forming apparatus 135, thereby forming the glass ribbon 105. The glass ribbon 105 is drawn downward from the forming apparatus 135 by the draw apparatus 200. While the forming apparatus 135 as shown and described herein implements a fusion draw process, it should be understood that other forming apparatuses may be used including, without limitation, slot draw apparatuses and the like.

The draw apparatus 200 includes one or more roller assemblies 210. A transition member or shroud 212 surrounds the upper reaches of the glass ribbon 105 below the root 139 and connects with an upper enclosure or baffle 214 that houses the forming apparatus 135. The roller assemblies 210 are arranged at positions along the draw apparatus 200 to contact the glass ribbon 105 as the glass ribbon 105 moves through the draw apparatus 200. Each of the roller assemblies 210 includes a shaft 220 and a contact or roll surface 222 disposed over the shaft 220. The contact surface 222 can assume various forms appropriate for contacting the glass ribbon 105. As understood by one of skill in the art, support structures, bearings, and a means for a driving force (e.g., a drive motor), if needed, can also be provided. That is to say, one or more of the roller assemblies 210 can be driven, whereas others of the roller assemblies 210 can be freewheeling (e.g., non-driven idler rollers). In the embodiment depicted in FIG. 1, each of the roller assemblies 210 extends across only a portion of the width of the glass ribbon 105, and each is positioned proximate to an edge of the glass ribbon 105. In other embodiments (not shown), one or more of the roller assemblies 210 extend across the entire width of the glass ribbon 105. Regardless, one or more of the roller assemblies 210 can serve to draw the glass ribbon 105 along a draw path extending transverse to the width of the glass ribbon 105.

At least one heat transfer device 250 is provided with the glass manufacturing apparatus 100 and can, in some embodiments, be considered a component of the draw apparatus 200, located proximate the root 139 of the forming apparatus 135 as represented schematically in FIG. 1. Details on the heat transfer assemblies of the present disclosure are provided below. In general terms, the heat transfer device 250 functions to extract or absorb radiated from the glass ribbon 105 in an environment of the glass ribbon 105 (e.g., within the transition member 212), effecting desired cooling of the glass ribbon 105 while minimizing the formation of airflow vortices so as to maintain or manage convection cells within the environment.

Figure 2A:
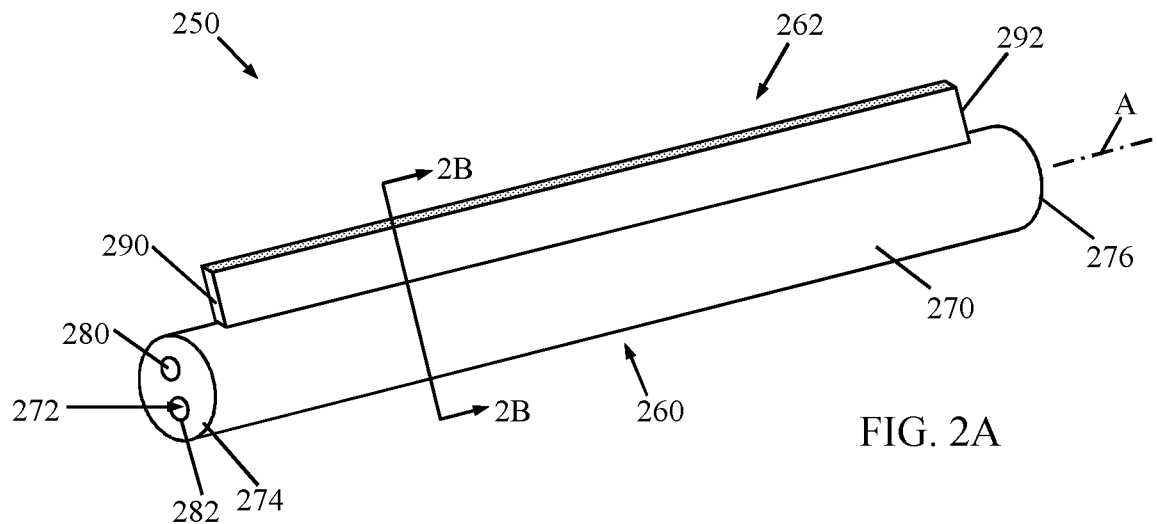
FIG. 2A is a simplified perspective view of a heat transfer device in accordance with principles of the present disclosure and useful with the glass manufacturing apparatus of FIG. 1.
Figure 2B:
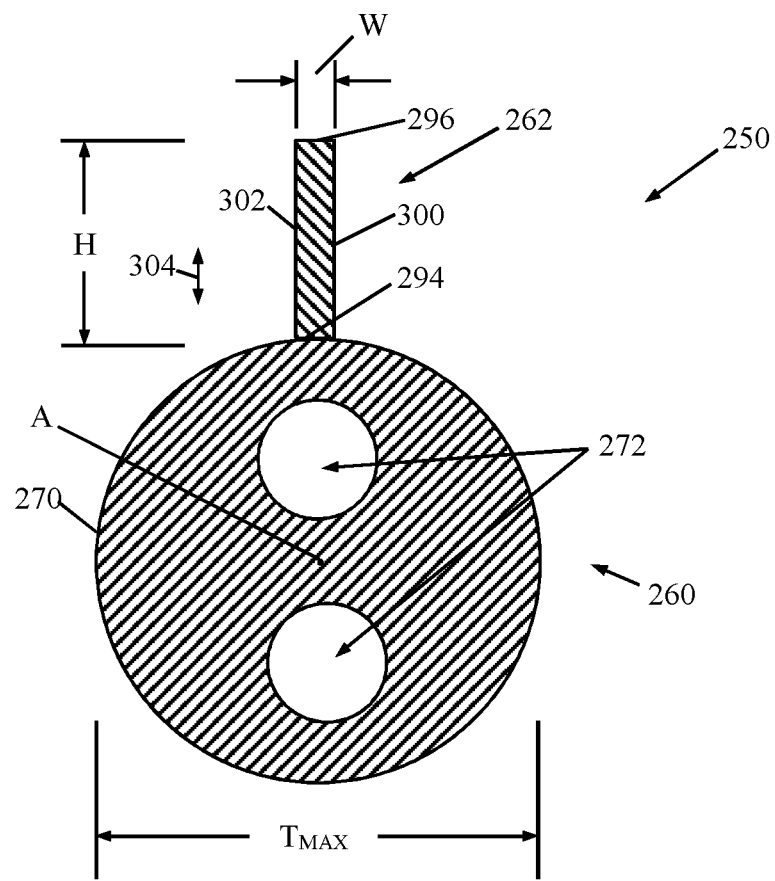
FIG. 2B is a cross-sectional view of the heat transfer device of FIG. 2A, taken along the line 2B-2B.

One embodiment of the heat transfer device 250 in accordance with principles of the present disclosure is shown in simplified form in FIGS. 2A and 2B, and includes a tube 260 and a fin 262. In general terms, the fin 262 is attached to and projects from an exterior surface of the tube 260 (optionally the tube 260 and the fin 262 are provided as a single, homogenous, integral body), and is configured (e.g., size, shape, or other physical characteristics) to influence or direct fluid flow along or about the heat transfer device 250.

The tube 260 can be an elongated body that forms or defines an exterior surface 270 and at least one interior passage 272. The elongated shape of the tube 260 defines a longitudinal axis A. In some non-limiting embodiments, a shape of the tube 260 is, or is akin to, a right cylinder. With these non-limiting constructions, in the transverse cross-sectional view of FIG. 2B (that is otherwise taken in a plane perpendicular to the longitudinal axis A), a shape of the exterior surface 270 is a circle or is substantially circular (i.e., within 5% of a truly circular shape). A maximum outer dimension $T_{MAX}$ of the tube 260 (in transverse cross-section) can thus be a diameter of the circular shape generated by the exterior surface 270. In some embodiments, a shape of the exterior surface 270 is uniform or substantially uniform (i.e., within 5% of being truly uniform) between opposing, first and second ends 274, 276 of the tube 260. Other shapes are also acceptable, including regular and irregular shapes. Regardless, the tube 260 is formed of a material selected to maintain its structural integrity in the presence of expected glass manufacturing temperatures, and is thermally conductive (e.g., metal).

In some embodiments, the heat transfer device 250 is configured to transfer heat at the exterior surface 270 to a fluid (e.g., liquid such as water) flowing through the tube 260. With this in mind, the interior passage 272 provides a flow path for the heat transfer fluid (not shown). The interior passage 272 can establish a recirculating-type flow path within the tube 260, having an inlet 280 and an outlet 282 at the first end 274 (i.e., the interior passage 272 is closed relative to the second end 276). Other configurations are also acceptable, such as the outlet 282 being formed at or open to the second end 276. In yet other embodiments, two or more interior passages 272 can be formed, such as a tube within a tube construction). Regardless, the heat transfer device 250 can be provided as part of a heat transfer assembly that further includes a source of cooling fluid (not shown) that is in fluid communication with the interior passage 272 and operating to cycle a cooling fluid through the interior passage 272.

The fin 262 is assembled to and projects from the exterior surface 270. The fin 262 can have an elongated shape in extension between opposing, first and second sides 290, 292 that otherwise generally corresponds with the longitudinal axis A. With respect to the transverse cross-sectional plane of FIG. 2B, projection of the fin 262 from the exterior surface 270 can be viewed as defining a fixed end 294 and a free end 296. The fixed end 294 corresponds to the point or line of intersection of the fin 262 with the exterior surface 270. The free end 296 is opposite the fixed end 294. Opposing, first and second faces 300, 302 of the fin 262 extend between the fixed and free ends 294, 296. With these conventions in mind, the fin 262 defines a height H in a height direction 304 between the fixed end 294 to the free end 296 (e.g., linear distance from the exterior surface 270 to the free end 296), and a width W in a direction perpendicular to the height direction 304 (e.g., linear distance between the first and second faces 300, 302). In some embodiments, the fin 262 is configured such that, relative to a transverse cross-sectional plane (e.g., FIG. 2B), the width W of the fin 262 at the fixed end 294 is less than the maximum outer dimension $T_{MAX}$ of the tube 260.

Figure 3A:
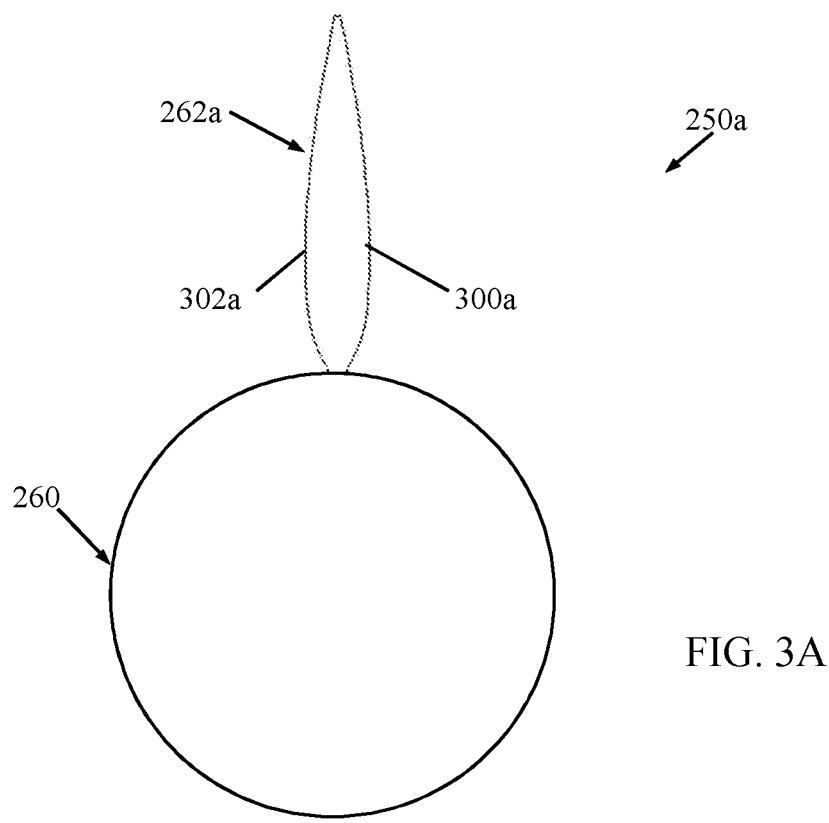
FIG. 3A is a simplified end view of another heat transfer device in accordance with principles of the present disclosure.

A shape of the fin 262 is configured to affect or manage airflow in a desired fashion as described in greater detail below. In some embodiments, the fin 262 can be akin to a plate, having the rectangular-like transverse cross-sectional shape illustrated in FIG. 2B. With these and related constructions, the first and second faces 300, 302 can each be flat or substantially flat (i.e., within 10% of a truly flat shape) and can be parallel or substantially parallel (i.e., within 10% of a truly parallel relationship) in extension between the opposing sides 290, 292 (FIG. 2A). Other configurations are also acceptable. For example, the width W of the fin 262 can taper or vary between the fixed and free ends 294, 296. In other embodiments, one or both of the opposing faces 300, 302 can incorporate one or more curves. FIG. 3A, for example, provides a simplified end view of an alternative heat transfer device 250a in accordance with principles of the present disclosure, and includes the tube 260 as described above along with a fin 262a. With the embodiment of FIG. 3A, the fin 262a can have a symmetrical airfoil-like shape, with the opposing faces 300a, 302a exhibiting one or more curves. Other airfoil shapes are also acceptable, and need not be symmetrical. Along these same lines, and returning to FIGS. 2A and 2B, the opposing faces 300, 302 need not have identical shapes or configurations. One or both of the opposing faces 300, 302 can include or form surface irregularities, such as protrusions and/or depressions.

Figure 3B:
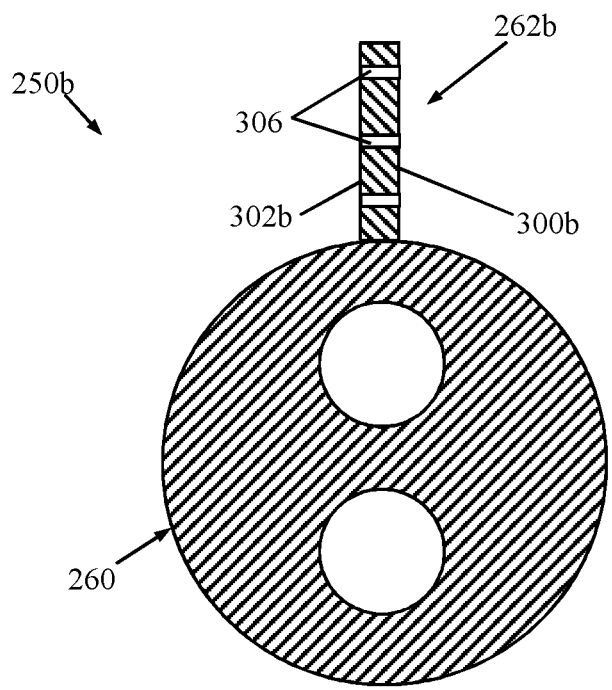
FIG. 3B is a cross-sectional view of another heat transfer device in accordance with principles of the present disclosure.

In some embodiments, the fin 262 can be a solid, continuous structure or body. In other embodiments, the fin 262 can include one or more holes or voids for influencing airflow along the fin 262. For example, the alternative heat transfer device 250b of FIG. 3B includes the tube 260 as described above, along with a fin 262b. With the embodiment of FIG. 3B, the fin 262b has a perforated construction, defining a plurality of holes 306 through a thickness thereof (e.g., one or more of the holes 306 are open to both of the opposing faces 300b, 302b).

Figure 3C:
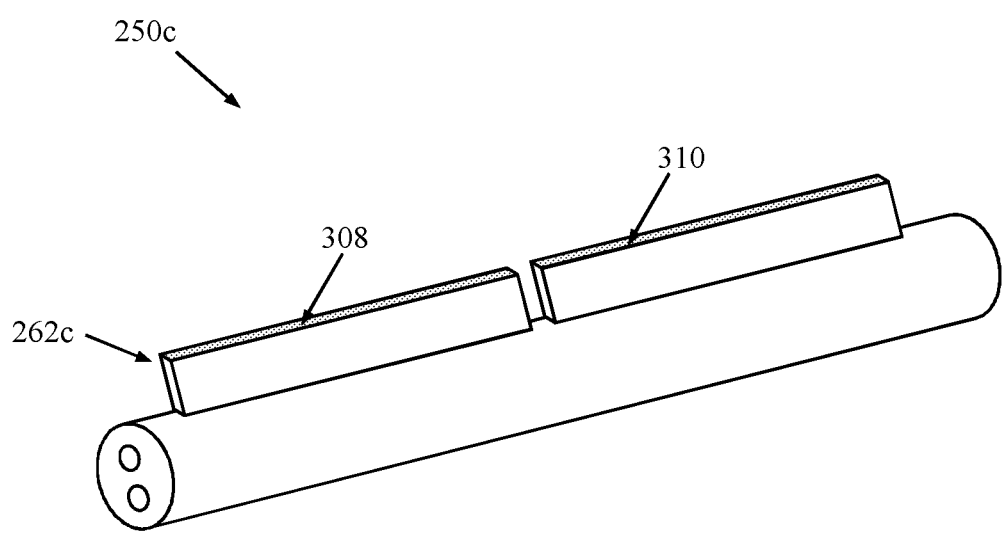
FIG. 3C is a simplified perspective view of another heat transfer device in accordance with principles of the present disclosure.

Returning to FIGS. 2A and 2B, in some embodiments, a shape of the fin 262 can be substantially uniform (i.e., within 10% of a truly uniform shape) in extension between the opposing, first and second sides 290, 292. In other embodiments, the fin 262 can have a non-uniform construction. For example, one or more interruptions can be formed along a length of the fin 262. In related embodiments, and as reflected by the alternative heat transfer device 250c of FIG. 3C, the fin 262c can be collectively defined by two (or more) longitudinally spaced fin segments 308, 310. The fin segments 308, 310 may or may not have an identical shape. Returning to FIGS. 2A and 2B, in other embodiments, the heat transfer devices of the present disclosure can include two (or more) of the fins 262 projecting from the tube 260 at circumferentially-spaced locations. While FIG. 2A illustrates that the elongated shape of the fin 262 can be generally aligned with or parallel to the longitudinal axis A of the tube 260, other arrangements are acceptable. For example, the fin 262 can have a helical-like shape, spirally winding about the tube 260; alternatively, the elongated shape of the fin 262 can be off-set relative to the longitudinal axis A (e.g., the opposing sides 290, 292 of the fin 262 need not be linearly aligned in a direction of the longitudinal axis A). Further, while a length of the fin 262 is illustrated as generally corresponding to the length of the tube 260 (e.g., in the non-limiting arrangement of FIG. 2A, the first side 290 of the fin 262 is slightly spaced from the first end 274 of the tube 260, and the second side 292 of the fin 262 is slightly spaced from the second end 276 of the tube 260), other constructions are also acceptable. For example, one or both of the sides 290, 292 of the fin 262 can be closer to or further away from the corresponding end 274, 276 of the tube 260.

Figure 3D:
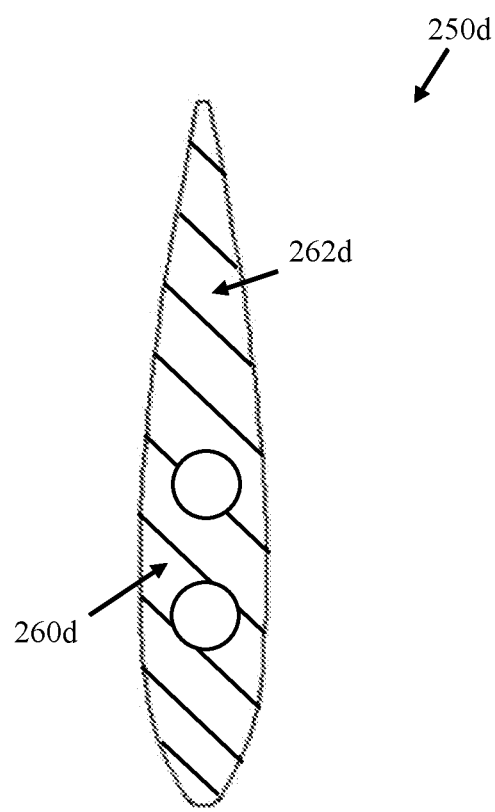
FIG. 3D is a cross-sectional view of another heat transfer device in accordance with principles of the present disclosure.

In other embodiments, the heat transfer devices of the present disclosure provide the tube and fin(s) as single, homogeneous body or structure. For example, FIG. 3D illustrates another embodiment heat transfer device 250d in accordance with principles of the present disclosure and comprises a tube section 260d and a fin section 262d. The heat transfer device 250d has an airfoil shape in transverse cross-section as shown. Other shapes are also acceptable.

Figure 4:
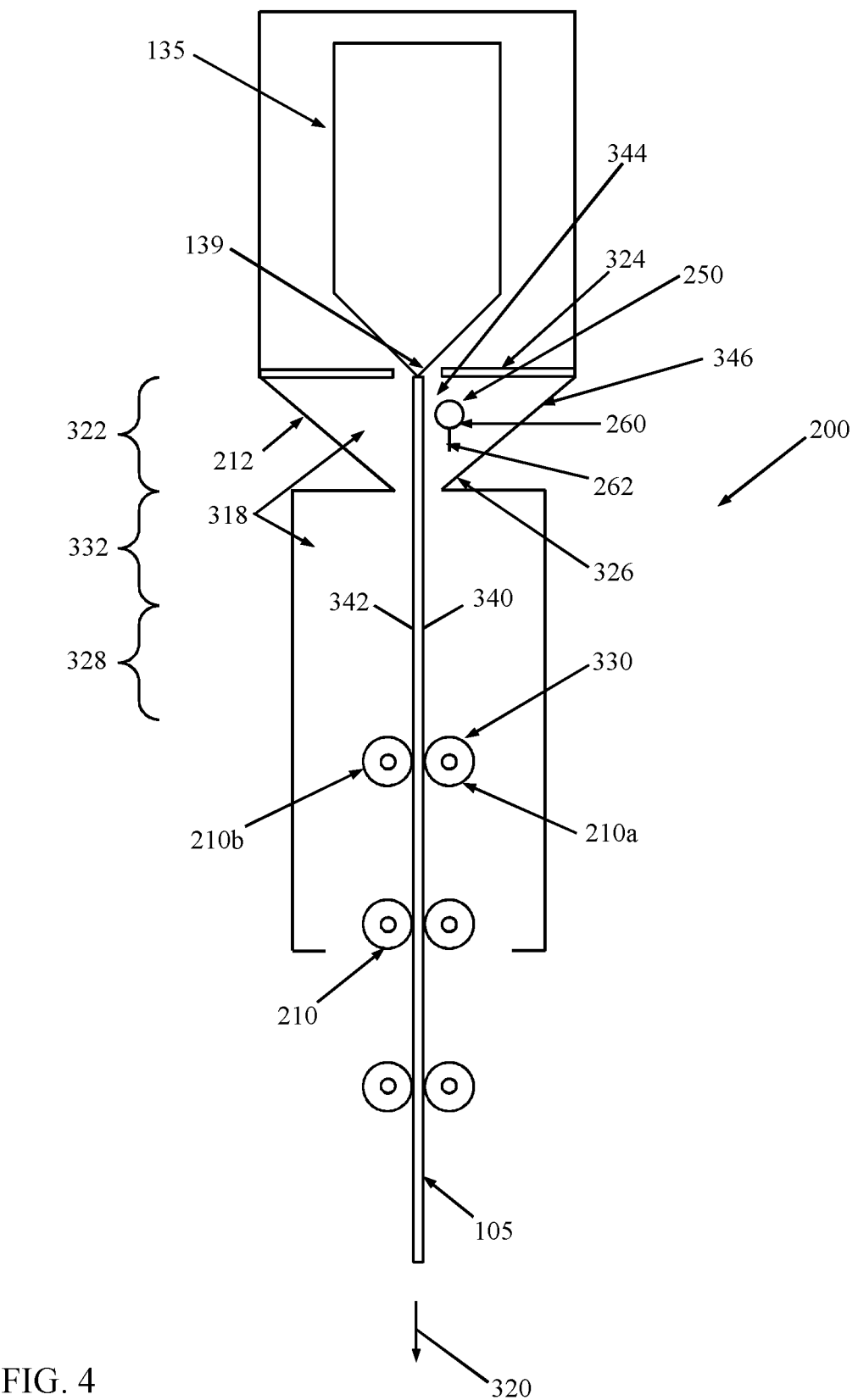
FIG. 4 is a simplified side view of a portion of the glass manufacturing apparatus of FIG. 1, including a draw apparatus drawing a glass ribbon from a forming apparatus and including a heat transfer device in accordance with principles of the present disclosure.

FIG. 4 illustrates one arrangement of the heat transfer device 250 as part of the draw apparatus 200 of FIG. 1 in a glass manufacturing process. In general terms, walls of the transition member 212 defines an interior space 318 (referenced generally) through which the glass ribbon 105 travels; the heat transfer device 250 can be located anywhere within the interior space 318. As a point of reference, in some embodiments one or more regions or zones can be defined along the draw apparatus 200 that generally correspond to conditions of the glass ribbon 105 as the glass ribbon 105 travels in a downstream direction 320 (e.g., down draw direction) from the root 139 of the forming apparatus 135, transforming from a supple but thick liquid to a stiff glass (it being recognized that the glass ribbon 105 experiences intricate structural changes, not only in physical dimensions but on a molecular level). A transition upper region 322 initiates at the root 139 and generally corresponds with the glass ribbon 105 being viscous or in a viscous state. With some glass manufacturing processes, an upstream partition or gate 324 and a downstream partition or flapper 326 are included with the transition member 212 that serves to provide a degree of thermal isolation to an environment of the glass ribbon 105 as it exits from the root 139. Where provided, the downstream partition 326 can be viewed as defining a downstream extent of the transition upper region 322. A transition lower region 328 can be identified downstream of the transition upper region 322, approximately at or immediately upstream of a first pair of rollers 330. One or both of the roller assemblies (identified as 210a, 210b in FIG. 4) of the first pair of rollers 330 can be driven rollers, and apply a pulling force onto the glass ribbon 105. A transition middle region 332 can be identified between the transition upper region 302 and the transition lower region 328. The transition middle region 332 initiates at the downstream partition 326 (where provided). The glass ribbon 105 is considered to transform from the viscous state to a visco-elastic state and/or elastic state as it travels through the transition middle region 332 and the transition lower region 328. Thus and while not shown in FIG. 4, exemplary heat transfer devices 250 can be provided at any location in the interior space 318 including, but not limited to, the transition upper region 322, transition lower region 328, transition middle region 332, and other regions defined by the interior space 318.

With the above designations in mind, the heat transfer device 250 is arranged so as to be in relatively close proximity to, but spaced from, the glass ribbon 105. The glass ribbon 105 can be viewed as having opposing, first and second major surfaces 340, 342. The heat transfer device 250 is located proximate but spaced from the first major surface 340. In some embodiments no other physical structure is positioned between the heat transfer device 250 and the first major surface 340, such that with the non-limiting configuration of FIG. 4, the heat transfer device 250 can be considered a "direct view" heat transfer device relative to the glass ribbon 105. During use (e.g., flowing of a cooled fluid such as water through the tube 260), the heat transfer device 250 functions to absorb or extract heat of the glass ribbon 105 via radiation. Further, the fin 262 is spatially arranged to minimize airflow disruptions and/or facilitate a steady flow field in an immediate environment of the heat transfer device 250 and the glass ribbon 105.

Figures 5A, 5B, 5C:
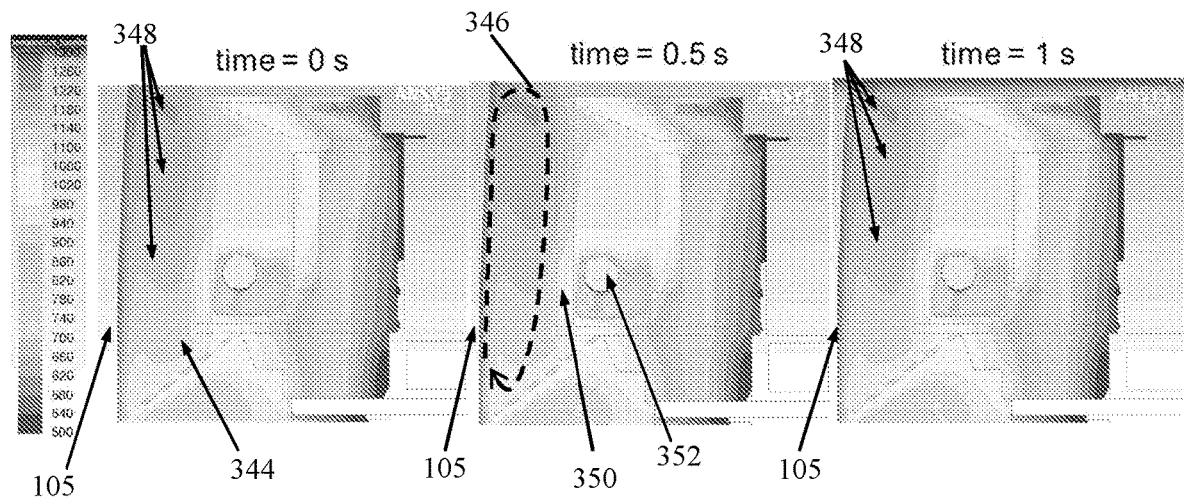
FIGS. 5A-5C are calculated temperature fields over time along a portion of a draw apparatus akin to the draw apparatus of FIG. 4 with the heat transfer device omitted while drawing a glass ribbon.

In some embodiments, the heat transfer device 250 is located in the transition upper region 322 as shown, and is oriented such that extension of the fin 262 from the tube 260 corresponds with a direction of an expected air flow field in a vicinity of the heat transfer device 250. For example, the transition upper region 322 can be viewed as having or defining an air cavity 344 bounded by the first major surface 340 of the glass ribbon 105 and wall(s) of the transition member 212 closest to the first major surface 340 (e.g., the upstream partition 324, the downstream partition 326 and a side wall portion 346 most proximate the first major surface 320). The glass ribbon 105 will have a highly elevated temperature as it exits the root 139, radiating heat into the air cavity 344. A temperature of the heat transfer device 250 (e.g., with cooling fluid flowing through the tube 260) will be well below that of the glass ribbon 105; heat in the air cavity 344 is absorbed or extracted by the heat transfer device 250. Temperature differentials between the glass ribbon 105 and the heat transfer device 250 form convection cells within the air cavity 344. More particularly, air in the vicinity of the glass ribbon 105 rises up, turns right (relative to the orientation of FIG. 4) below the upstream partition 324, and comes down. By way of further explanation, FIGS. 5A-5C show a calculated temperature field over time for the glass ribbon 105 traveling through the transition upper region air cavity 344 in the absence of the heat transfer device 250 (FIG. 4). An airflow or stream 346 and convection cells 348 as described above are identified. As a point of clarification, although the heat transfer device 250 is not included or accounted for in the calculated temperature fields of FIGS. 5A-5C for purposes of understanding, other optional components that may be included with some draw apparatuses of the present disclosure are reflected by the views, such as an intermediate wall 350 and a cooling apparatus 352. With some conventional fusion-type glass manufacturing systems, the cooling apparatus 352 (that is otherwise not a heat transfer device described above) is provided "behind" the intermediate wall 350 and thus is not in a "direct view" arrangement relative to the glass ribbon 105. FIGS. 5A-5C illustrate that while there is a strong convection cell pattern within the air cavity 344, the temperature field is essentially the same at different time steps, implying a steady flow.

Figures 6A, 6B, 6C:
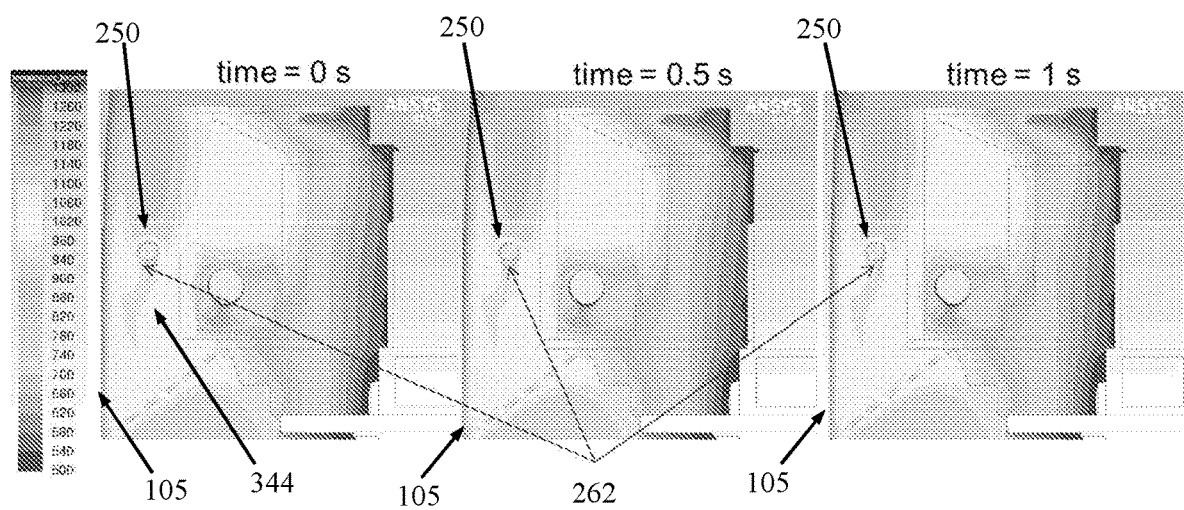
FIGS. 6A-6C are calculated temperature fields over time along a portion of a draw apparatus including a heat transfer device in accordance with principles of the present disclosure while drawing a glass ribbon.

Returning to FIG. 4, the heat transfer device 250 is arranged such that the fin 262 extends or is oriented in a direction of the expected airflow pattern described above. For example, and with respect to the non-limiting embodiment of FIG. 4, the heat transfer device 250 is arranged such that extension of the fin 262 from tube 260 is in the downstream direction. The calculated temperature fields of FIG. 6A-6C illustrate the effect of this orientation over time. As a point of reference, the parameters or constraints utilized in generating the calculated temperature fields of FIGS. 6A-6C are identical to those with FIGS. 5A-5C, except that FIGS. 6A-6C account for the presence and cooling effects of the heat transfer device 250 (including orientation of the fin 262 relative to the flow pattern). FIGS. 6A-6C reveal that the temperature fields with the heat transfer device 250 including the fin 262 oriented toward the airflow in the approximate center of the transition upper region air cavity 344 exhibit a steady flow pattern over time. The so-oriented fin 262 streamlines the flow. With additional reference to FIG. 4, in some embodiments the flow pattern in a region of the heat transfer device 250 can correspond with the downstream direction 320; the heat transfer device 250 can be oriented such that extension of the fin 262 from the tube 260 corresponds with the downstream direction 320. A number of other orientations are also acceptable based, at least in part, upon the flow conditions about the heat transfer device 250.

Figures 7A, 7B, 7C:
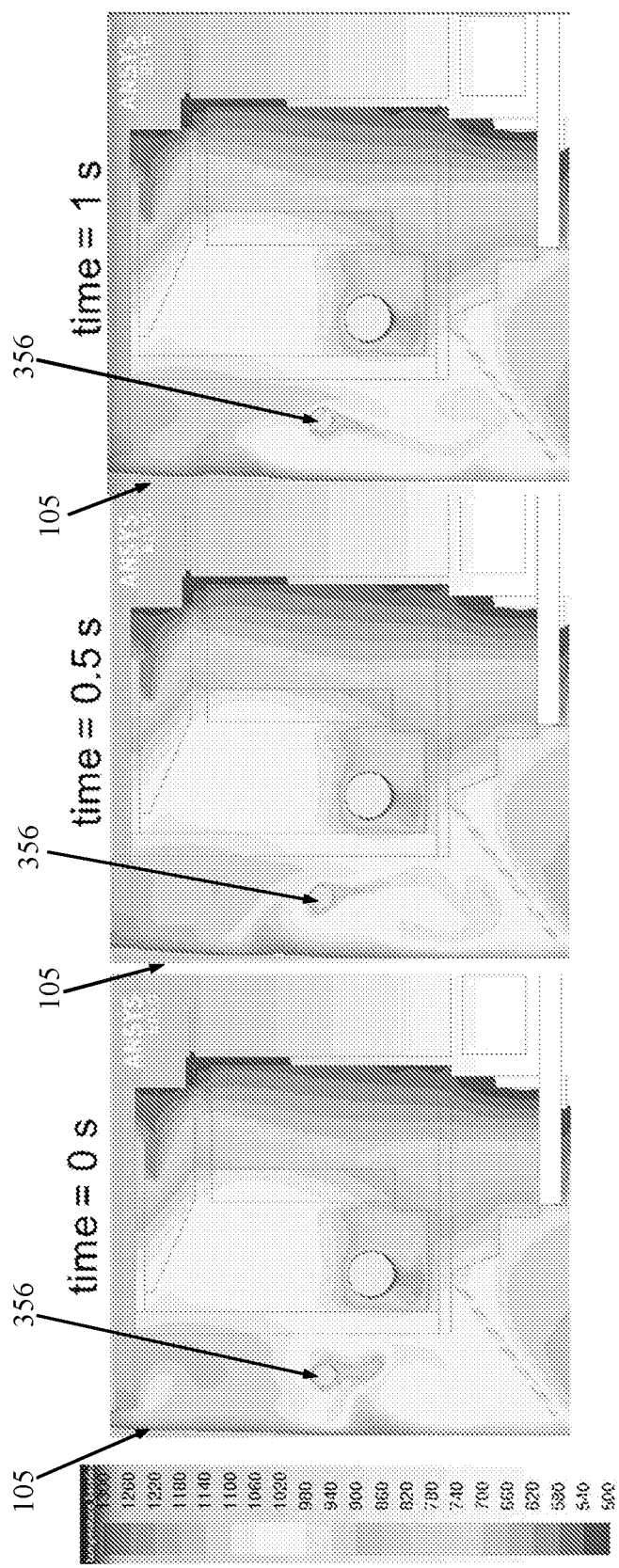
FIGS. 7A-7C are calculated temperature fields over time along a portion of a draw apparatus including a conventional cooling device while drawing a glass ribbon.

The heat transfer device 250 construction and orientation can optionally further be described as exhibiting reduced vortex shedding within the immediate environment of the glass ribbon. FIGS. 7A-7C show calculated temperature fields over time in the transition upper region air cavity 344 as generated by the glass ribbon 105 and a cooling apparatus 356. The cooling apparatus 356 differs from the heat transfer devices of the present disclosure, and does not include the fin 262 (FIG. 2A). There is an unsteadiness in the temperature field of FIGS. 7A-7C. More particularly, presence of the cooling apparatus 356 in the bath of convection cells/airflow generates vortices or vortex shedding, giving rise to the unsteady flow (and temperature) field. A comparison of FIGS. 6A-6C with FIGS. 7A-7C reveals that the heat transfer devices of the present disclosure, including the fin 262 beneficially oriented relative to the air flow, minimize the formation of vortices or vortex shedding as compared cooling devices or apparatuses conventionally employed with glass manufacturing systems. Alternatively or in addition, unlike the conventional constructions exemplified by FIGS. 7A-7C, the heat transfer devices of the present disclosure can be described as being configured to establish laminar flow or substantially laminar flow (i.e., within 5% of truly laminar flow) within a region of the heat transfer device.

Returning to FIG. 4, the heat transfer devices 250 of the present disclosure can be useful with a plethora of different glass manufacturing techniques and glass formulations. By way of non-limiting example, with the fusion approach reflected by FIG. 4, for some glass formulations (e.g., low viscosity glass, such as glass having a liquidus viscosity of less that about 100,000 poise as described in Allan et al, U.S. Pat. No. 8,429,936, the entire teachings of which are incorporated herein by reference), it can be desirable to subject the glass ribbon 105 to rapid cooling in the transition upper region 302 to eliminate occurrences of "baggy warp" in the glass. In some instances, a "direct view" cooling approach is necessary in order to provide the requisite level of glass ribbon cooling. As evidenced by FIGS. 7A-7C, however, conventional direct view cooling techniques can undesirably create an unsteady temperature field that in turn may impart imperfections into the glass ribbon 105 (e.g., formation of a wavy pattern on the major surface(s) 340, 342). Some embodiments of the present disclosure overcome these problems. In particular, the heat transfer devices of the present disclosure, when installed and oriented in the manners described above, can provide desired direct view cooling with minimal or no negative impact on the temperature field generated at the corresponding major surface 340, 342 of the glass ribbon 105.

Figure 8:
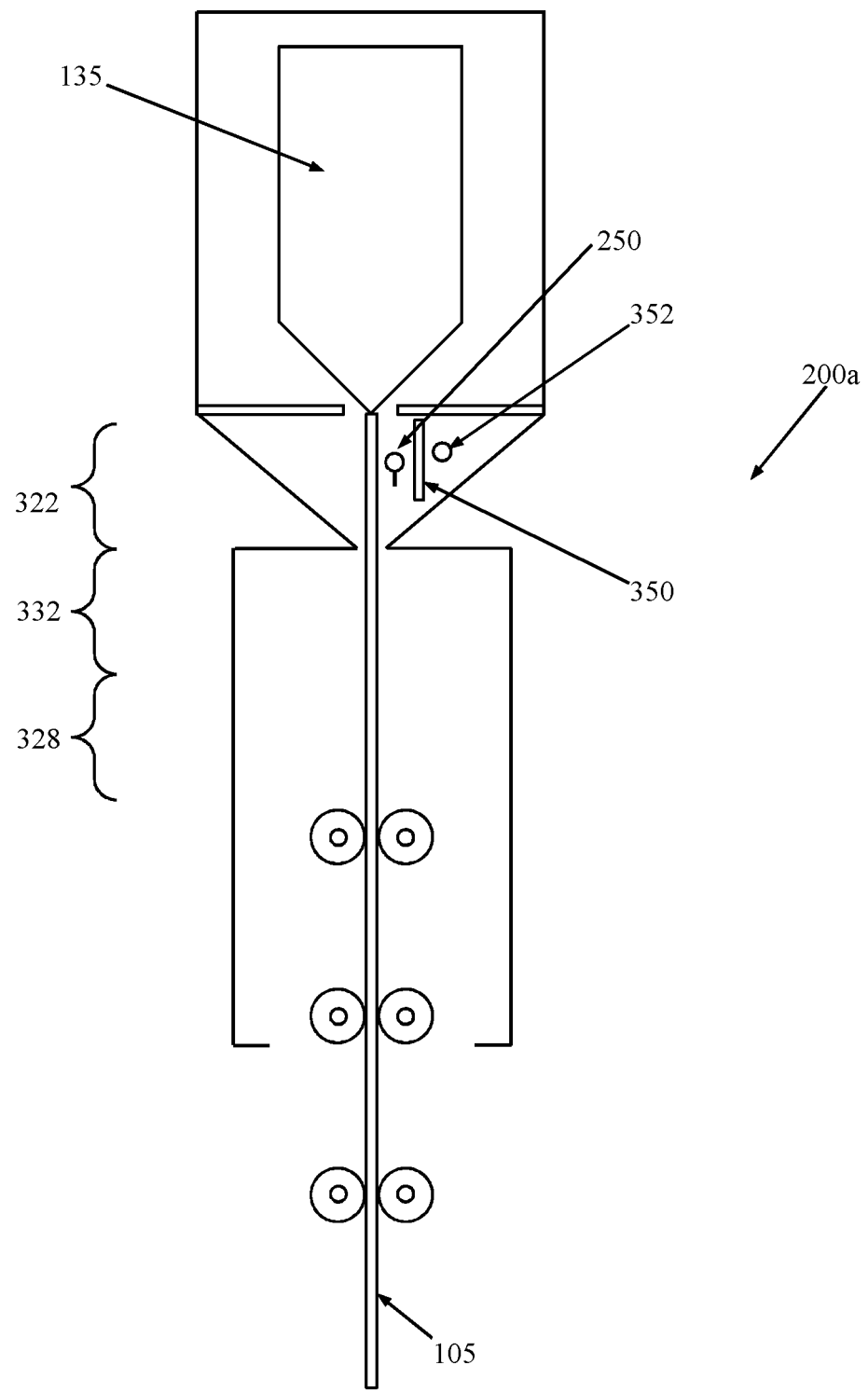
FIG. 8 is a simplified side view of portions of a glass manufacturing apparatus including another draw apparatus in accordance with principles of the present disclosure.

The draw apparatus 200 construction of FIG. 4, including a configuration and location of the heat transfer device 250 relative to the forming apparatus 135 and the glass ribbon 105, is one non-limiting example in accordance with principles of the present disclosure. For example, and as generally reflected by FIG. 8, an alternative draw apparatus 200a can include additional walls and/or cooling apparatus(es), such as the intermediate wall 350 and the cooling apparatus 352 mentioned above. The heat transfer device 250 is located between the intermediate wall 350 and the glass ribbon 105, and thus serves as a direct view heat transfer device. In some embodiments, the intermediate wall 350 and the cooling apparatus 352 (as well as additional cooling apparatuses located, for example, at the transition middle region 332, the transition lower region 328, etc.) can be provided as part of an existing draw apparatus, with the heat transfer device 250 being installed or retrofitted to the existing draw apparatus.

Figure 9:
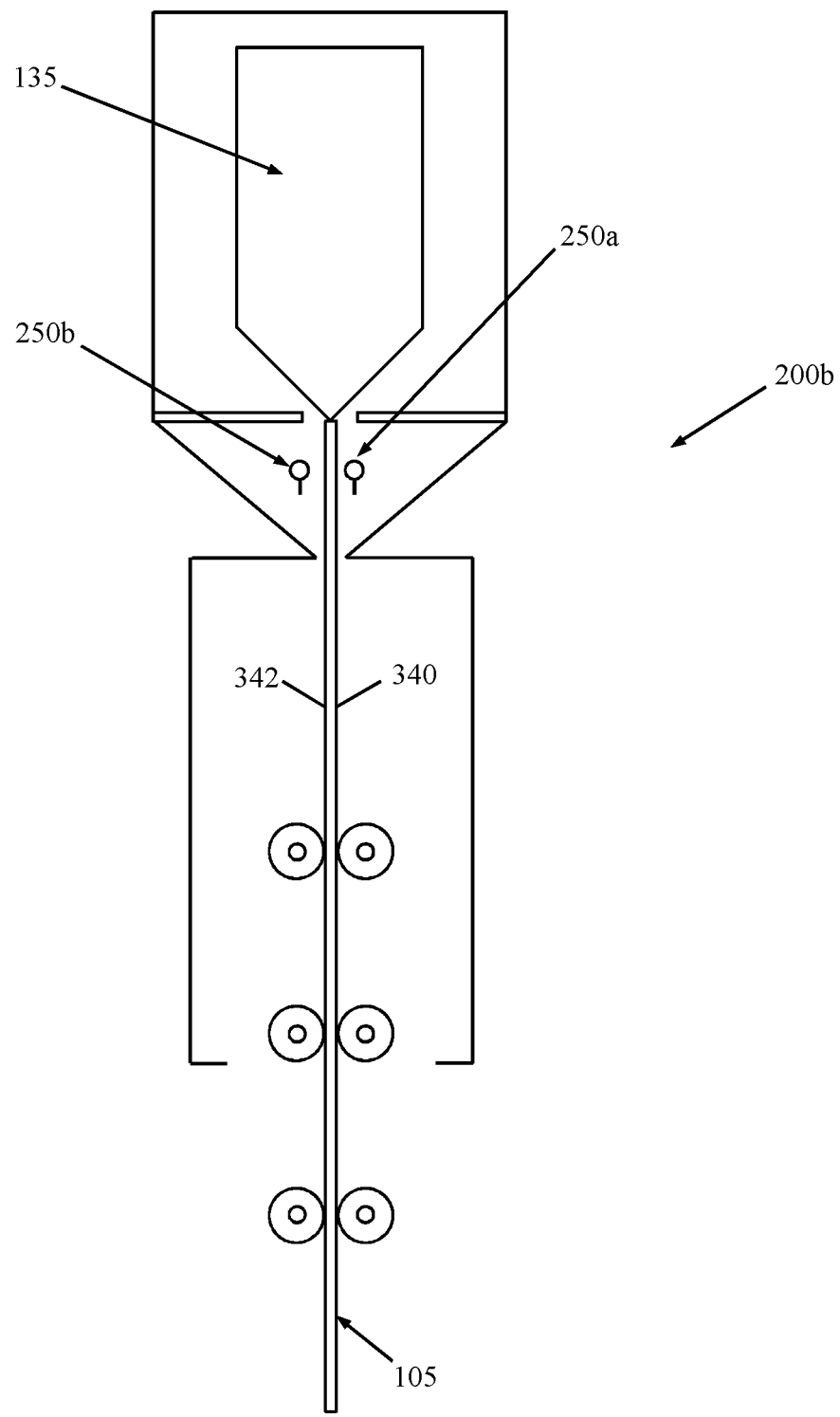
FIG. 9 is a simplified side view of portions of a glass manufacturing apparatus including another draw apparatus in accordance with principles of the present disclosure.
Figure 10:
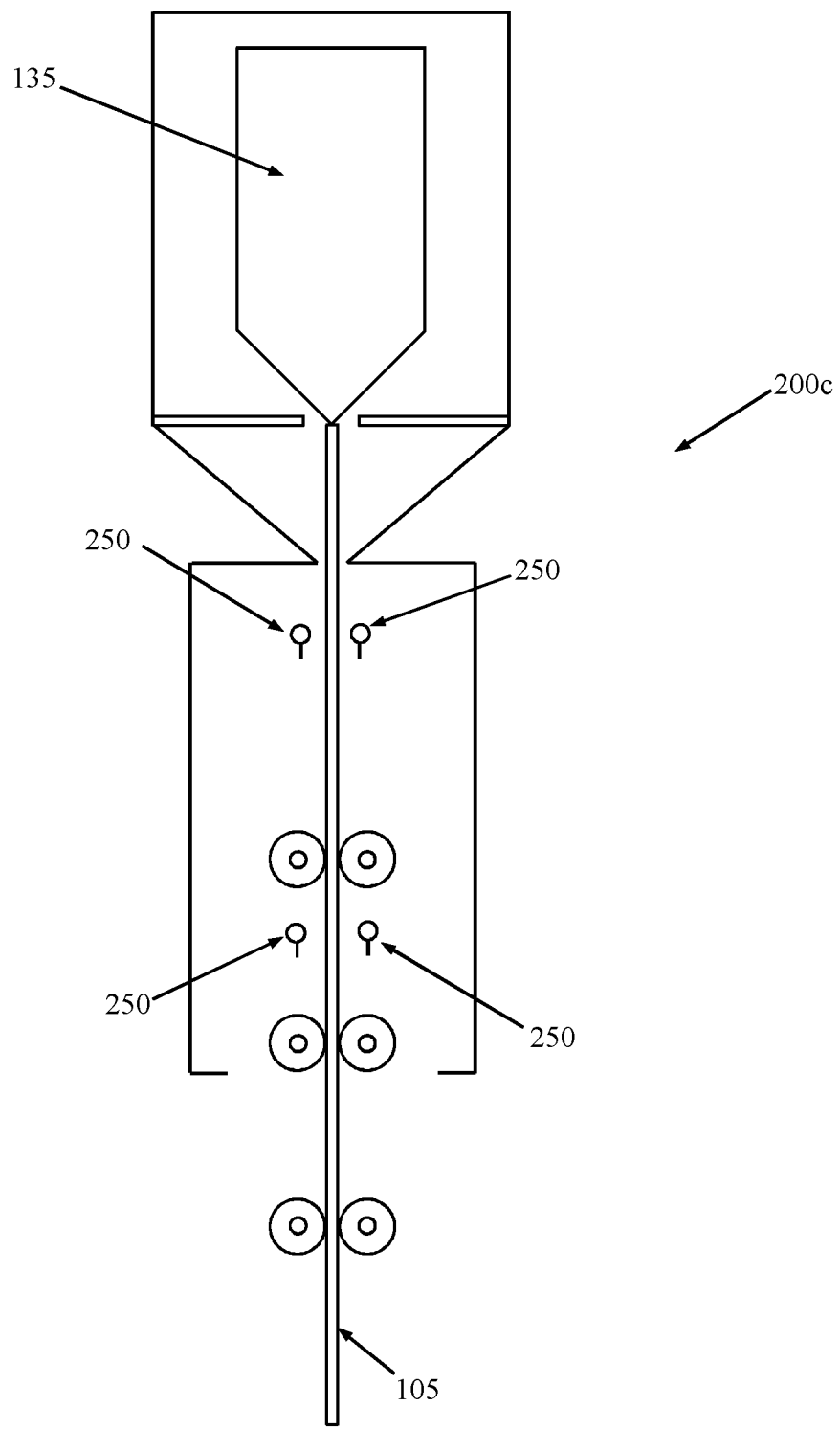
FIG. 10 is a simplified side view of portions of a glass manufacturing apparatus including another draw apparatus in accordance with principles of the present disclosure.

In other embodiments, two or more of the heat transfer devices of the present disclosure can be provided with the glass manufacturing system. For example, FIG. 9 illustrates another draw apparatus 200b in accordance with principles of the present disclosure that includes two of the heat transfer devices 250a, 250b. The first heat transfer device 250a is located as a direct view heat transfer device relative to the first major surface 340 of the glass ribbon 105, and the second heat transfer device 250b is located as a direct view heat transfer device relative to the second major surface 342. In yet other embodiments, the heat transfer device(s) 250 can be positioned at other locations along the travel path of the glass ribbon 105 as generally reflected, for example, by the draw apparatus 200c of FIG. 10.

Figure 11:
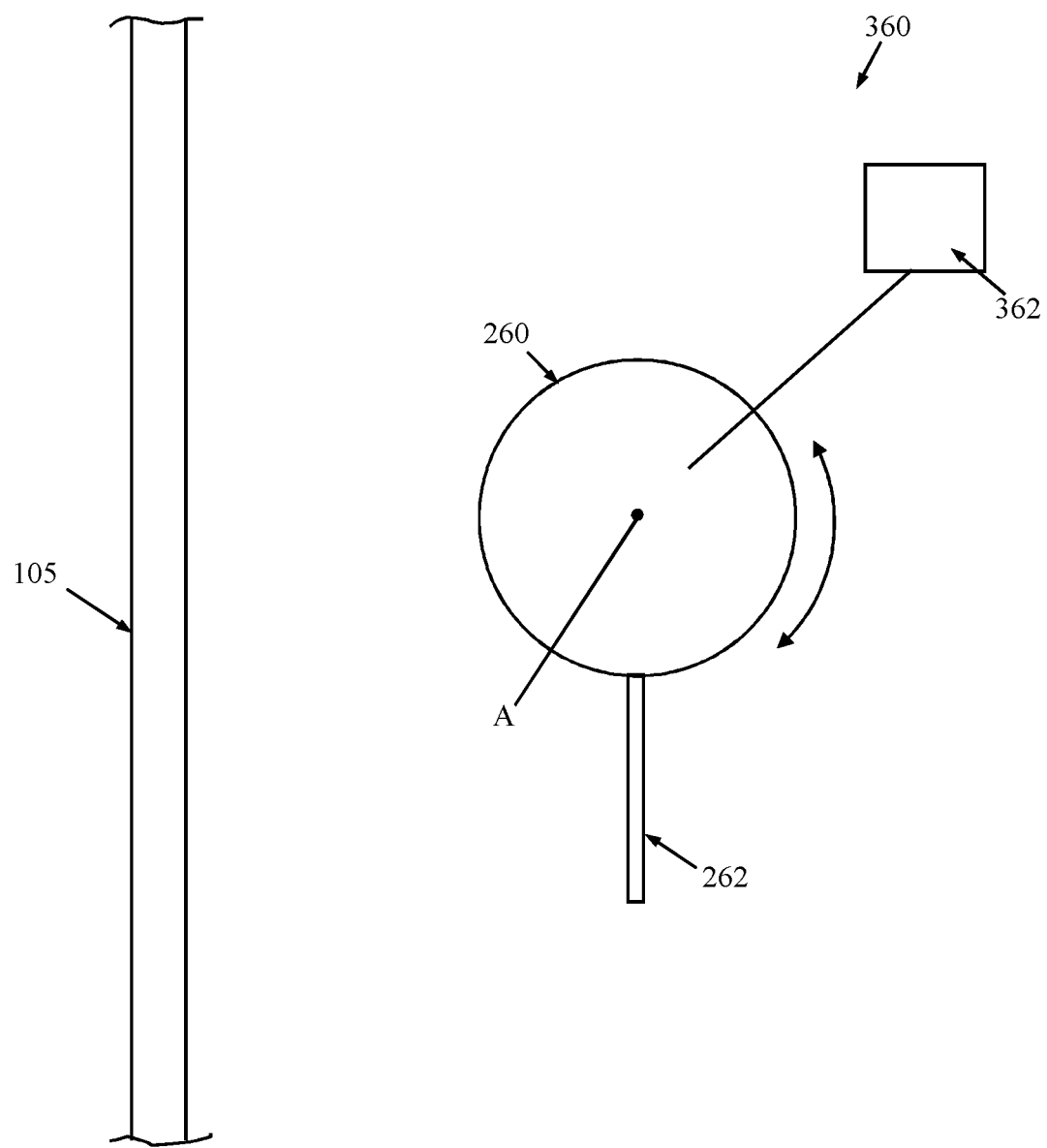
FIG. 11 is an enlarged, simplified side view of another heat transfer device in accordance with principles of the present disclosure relative to a glass ribbon.

The heat transfer devices of the present disclosure can be configured and installed so as to remain stationary during the glass manufacturing process. In other embodiments, the heat transfer device can be selectively movable. For example, FIG. 11 illustrates in simplified form portions of another heat transfer device 360 in accordance with principles of the present disclosure as installed relative to the glass ribbon 105. The heat transfer device 360 includes the tube 260 and the fin 262 as described above, along with an actuator mechanism 362. The actuator mechanism 362 is mechanically linked to the tube 260, and includes a motor or similar device. The actuator mechanism 362 is operable to change a spatial orientation (or location) of the fin 262, such as by causing the tube 260 to rotate about the longitudinal axis A. As represented by an arrow in FIG. 11, then, a spatial orientation of the fin 262 can be altered as desired, for example to correspond with airflow or temperature fields associated with a particular glass manufacturing process. When performing a different glass manufacturing process having different parameters or characteristics (e.g., glass formulation, temperatures, drawing forces, etc.), a different orientation of the fin 262 may be desirable and the actuator mechanism 362 is operated to achieve this different orientation.

Various modifications and variations can be made to the embodiments described herein without departing from the scope of the claimed subject matter. Thus it is intended that the specification cover the modifications and variations of the various embodiments described herein provided such modifications and variations come within the scope of the appended claims and their equivalents.

What is claimed is:

1. An apparatus to make a glass sheet, the apparatus comprising:
a forming apparatus to define a glass ribbon from a supply of molten glass;
a transition member enclosing the glass ribbon when the glass ribbon exits the forming apparatus, the transition member defining an interior space through which the glass ribbon travels, the interior space including an air cavity bounded by walls of the transition member closest to a first major surface of the glass ribbon, the walls including an upstream partition, a downstream partition angled from the upstream portion towards the first major surface, and a side wall portion most proximate to the first major surface; and
a first heat transfer device within the interior space, the first heat transfer device including:
a longitudinal axis oriented perpendicular to a travel direction of the glass ribbon,
a tube defining an exterior surface and an interior passage, and
a fin including a fixed end and a free end projecting from the exterior surface and being arranged such that an extension of the fin from the tube is in the downstream direction to extract heat from the glass ribbon while establishing substantially laminar airflow of air heated by the glass ribbon that rises up within an immediate environment of the glass ribbon within the interior space, wherein
a width of the fin at the fixed end is less than a maximum outer dimension of the tube.

2. The apparatus according to claim 1, wherein the a fixed end is at a point of intersection with the exterior surface and the free end is opposite the fixed end.

3. The apparatus according to claim 2, wherein in a cross-sectional plane perpendicular to a longitudinal axis of the tube, the fin defines a height in a height direction from the fixed end to the free end, and a width in a direction perpendicular to the height direction.

4. The apparatus according to claim 1, wherein the tube is cylindrical and the maximum outer dimension is an outer diameter of the tube.

5. The apparatus according to claim 1, further comprising:
a source of cooling fluid in fluid communication with the interior passage.

6. The apparatus according to claim 1, wherein the glass ribbon defines opposing, the first major surface and a second major surface, and further wherein the first heat transfer device is positioned adjacent to the first major surface, the apparatus further comprising:
a second heat transfer device within the interior space adjacent to the second major surface, the second heat transfer device including:
a tube defining an exterior surface and an interior passage, and
a fin projecting from the exterior surface of the tube of the second heat transfer device.

7. The apparatus according claim 1, wherein
the forming apparatus comprises a trough, and
the apparatus further comprises a draw apparatus to draw the glass ribbon from the forming apparatus and through the transition member along a down-draw path.

8. The apparatus according to claim 1, wherein the first heat transfer device is oriented such that a direction of projection of the fin from the tube corresponds with a direction in which the glass ribbon exits the forming apparatus.

9. The apparatus according to claim 1, wherein the fin includes a hole through a thickness thereof.

10. The apparatus according to claim 1, further comprising an actuator operably connected to the heat transfer device.

11. The apparatus according to claim 10, wherein the actuator is configured to alter a spatial orientation of the fin with respect to the glass ribbon.

12. The apparatus according to claim 11, wherein the actuator alters the orientation of the fin as a function of airflow or temperature fields within the interior space.

13. A draw apparatus to draw a glass ribbon from a forming apparatus, the draw apparatus comprising:
a transition member enclosing the glass ribbon when the glass ribbon exits the forming apparatus, the transition member defining an interior space through which the glass ribbon travels, the interior space including an air cavity bounded by walls of the transition member closest to a first major surface of the glass ribbon, the walls including an upstream partition, a downstream partition angled from the upstream portion towards the first major surface, and a side wall portion most proximate to the first major surface; and
a heat transfer device within the interior space, the heat transfer device including:
a longitudinal axis oriented perpendicular to a travel direction of the glass ribbon,
a tube defining an exterior surface and an interior passage, and
a fin including a fixed end and a free end projecting from the exterior surface and being arranged to extract heat from the glass ribbon while establishing substantially laminar airflow of air heated by the glass ribbon that rises up within an immediate environment of the glass ribbon within the interior space, wherein
a width of the fin at the fixed end is less than a maximum outer dimension of the tube.

14. The apparatus according to claim 13, wherein the fixed end is at a point of intersection with the exterior surface and the free end is opposite the fixed end.

15. The apparatus according to claim 14, wherein
in a cross-sectional plane perpendicular to a central axis of the tube, the fin defines a height in a height direction from the fixed end to the free end, and a thickness in a thickness direction perpendicular to the height direction.

16. The apparatus according to claim 13, wherein the tube is cylindrical and the maximum outer dimension is an outer diameter of the tube.

17. The apparatus according to claim 13, wherein the fin includes a hole through a thickness thereof.

18. The apparatus according to claim 13, further comprising an actuator operably connected to the heat transfer device.

19. The apparatus according to claim 18, wherein the actuator is configured to alter a spatial orientation of the fin with respect to the glass ribbon.

20. The apparatus according to claim 19, wherein the actuator alters the orientation of the fin as a function of airflow or temperature fields within the interior space.

21. A method for making a glass sheet, the method comprising:
   directing a glass ribbon through a transition member, the transition member enclosing the glass ribbon and defining an interior space through which the glass ribbon travels, the interior space including an air cavity bounded by walls of the transition member closest to a first major surface of the glass ribbon, the walls including an upstream partition, a downstream partition angled from the upstream portion towards the first major surface, and a side wall portion most proximate to the first major surface;
   extracting heat from the interior space with a heat transfer device during the step of directing the glass ribbon, the heat transfer device located within the interior space and including:
      a longitudinal axis oriented perpendicular to a travel direction of the glass ribbon,
      a tube defining an exterior surface and an interior passage, and
      a fin including a fixed end and a free end projecting from the exterior surface and being arranged such that an extension of the fin from the tube is in the downstream direction to extract heat from the glass ribbon; and
   establishing substantially laminar airflow of air heated by the glass ribbon that rises up within an immediate environment of the glass ribbon within the interior space, wherein
   a width of the fin at the fixed end is less than a maximum outer dimension of the tube.

22. The method according to claim 21, wherein the step of extracting heat includes directing airflow within the interior space along the fin to provide substantially laminar airflow within the interior space in a region of the heat transfer device.

23. The method according to claim 21, further comprising:
   flowing molten glass over a forming apparatus to form the glass ribbon; and
   drawing the glass ribbon from the forming apparatus and through the interior space along a down-draw path.

24. The method according to claim 21, wherein the fin includes a hole through a thickness thereof.

25. The apparatus method according to claim 21, further comprising, during the step of extracting heat from the interior space, operating an actuator connected to the heat transfer device.

26. The apparatus method according to claim 25, wherein the actuator is configured to alter a spatial orientation of the fin with respect to the glass ribbon.

27. The method according to claim 26, wherein the actuator alters the orientation of the fin as a function of airflow or temperature fields within the interior space.

\* \* \* \* \*

UNITED STATES PATENT AND TRADEMARK OFFICE
CERTIFICATE OF CORRECTION

PATENT NO. : 11,261,118 B2
APPLICATION NO. : 16/500580
DATED : March 1, 2022
INVENTOR(S) : Tomohiro Aburada et al.

It is certified that error appears in the above-identified patent and that said Letters Patent is hereby corrected as shown below:

In the Claims

In Column 11, Line 57, in Claim 2, delete "a fixed" and insert -- fixed --.

In Column 12, Line 17 (Approx.), in Claim 7, delete "claim" and insert -- to claim --.

In Column 14, Line 27 (Approx.), in Claim 25, delete "apparatus method" and insert -- method --.

In Column 14, Line 31 (Approx.), in Claim 26, delete "apparatus method" and insert -- method --.

Signed and Sealed this
Twenty-third Day of August, 2022

Katherine Kelly Vidal
*Director of the United States Patent and Trademark Office*